Aug. 17, 1943.    W. M. ALLISON    2,326,912
COMPRESSION RATIO CONTROL
Filed Feb. 24, 1941    4 Sheets-Sheet 1
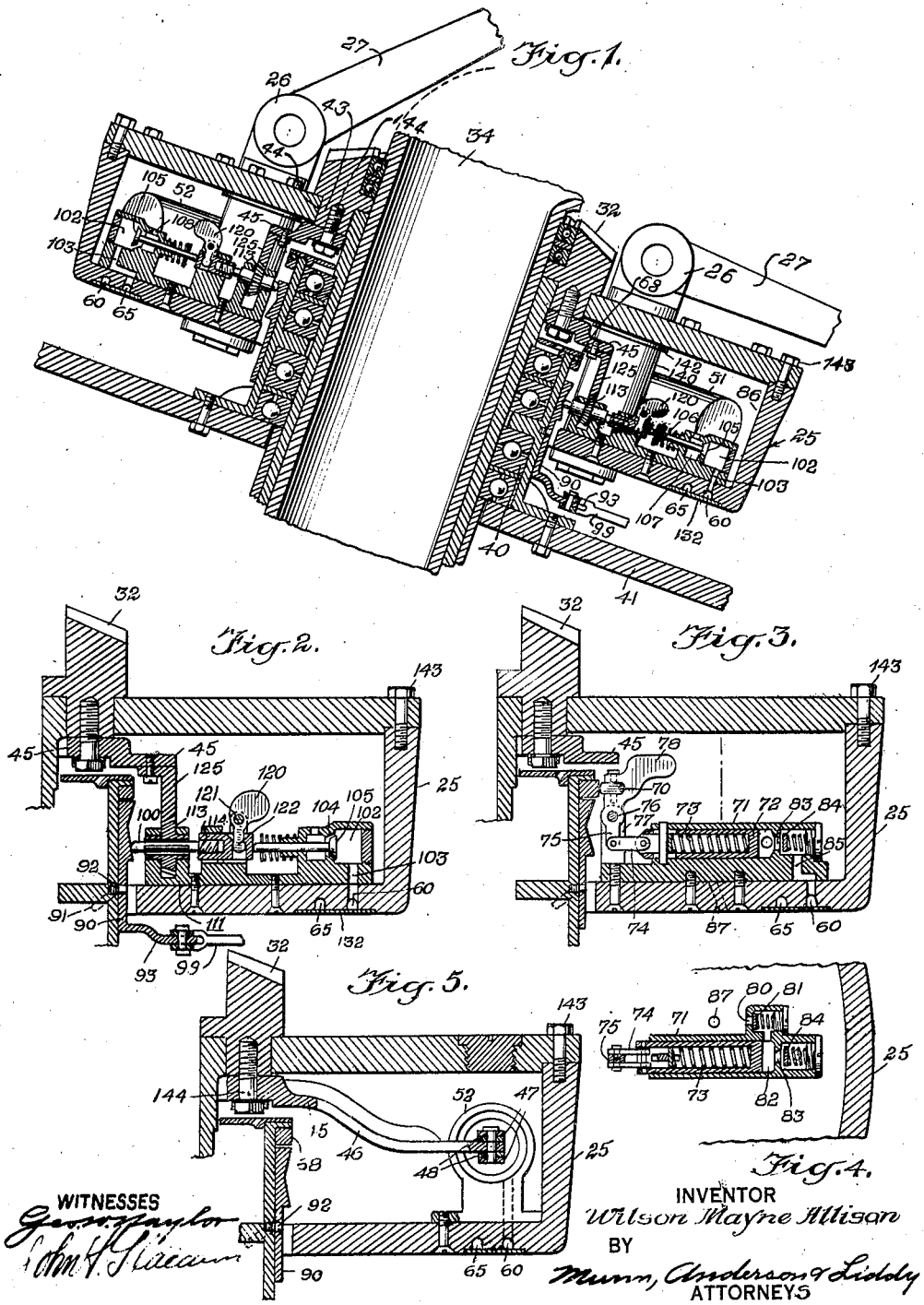
INVENTOR
Wilson Mayne Allison
BY
Munn, Anderson & Liddy
ATTORNEYS Aug. 17, 1943.  W. M. ALLISON  2,326,912
COMPRESSION RATIO CONTROL
Filed Feb. 24, 1941  4 Sheets-Sheet 2
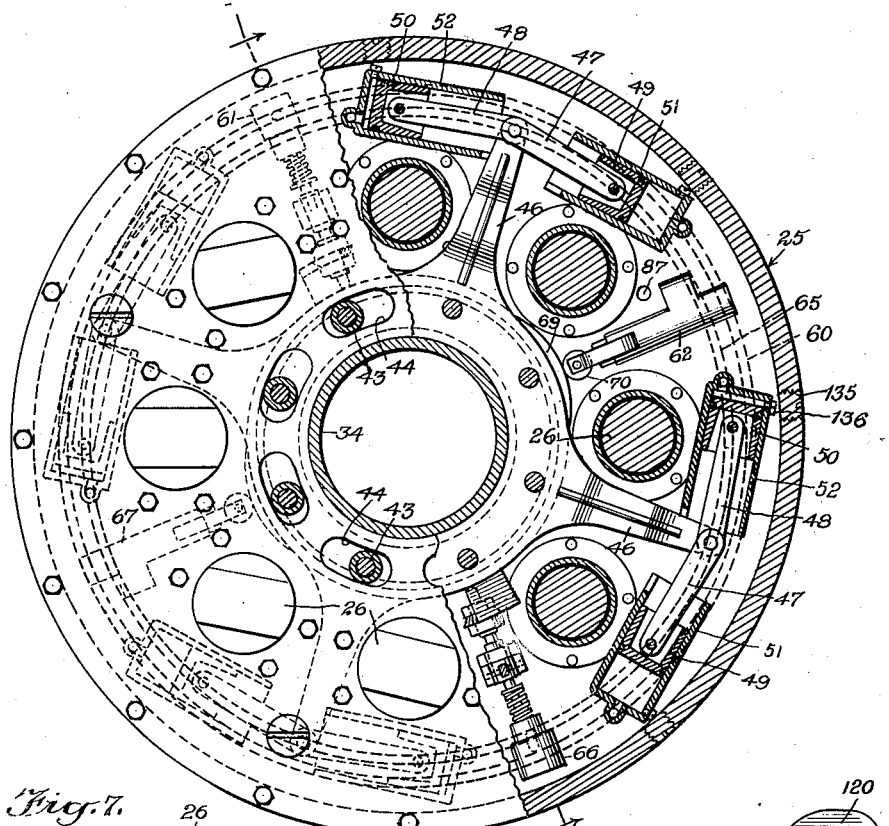
Fig. 6.
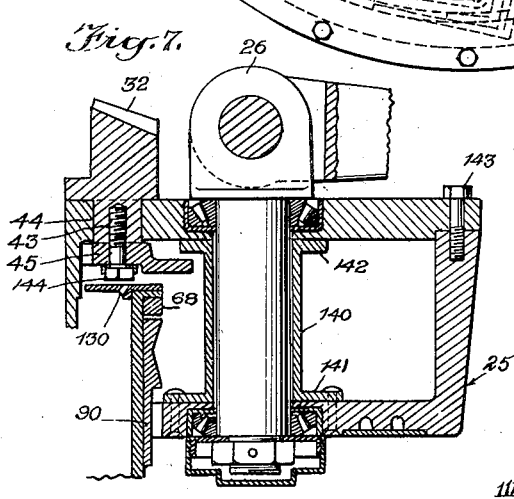
Fig. 7.
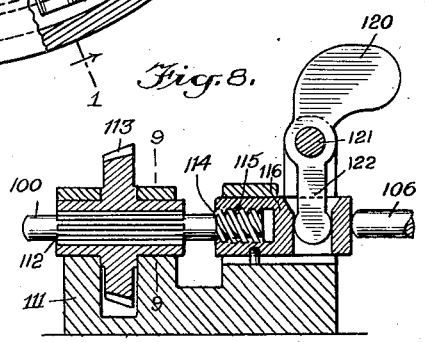
Fig. 8.
Fig. 9.
WITNESSES
INVENTOR
Wilson Mayne Allison
BY
Munn, Anderson & Liddy
ATTORNEYS Aug. 17, 1943.    W. M. ALLISON    2,326,912
COMPRESSION RATIO CONTROL
Filed Feb. 24, 1941    4 Sheets-Sheet 3
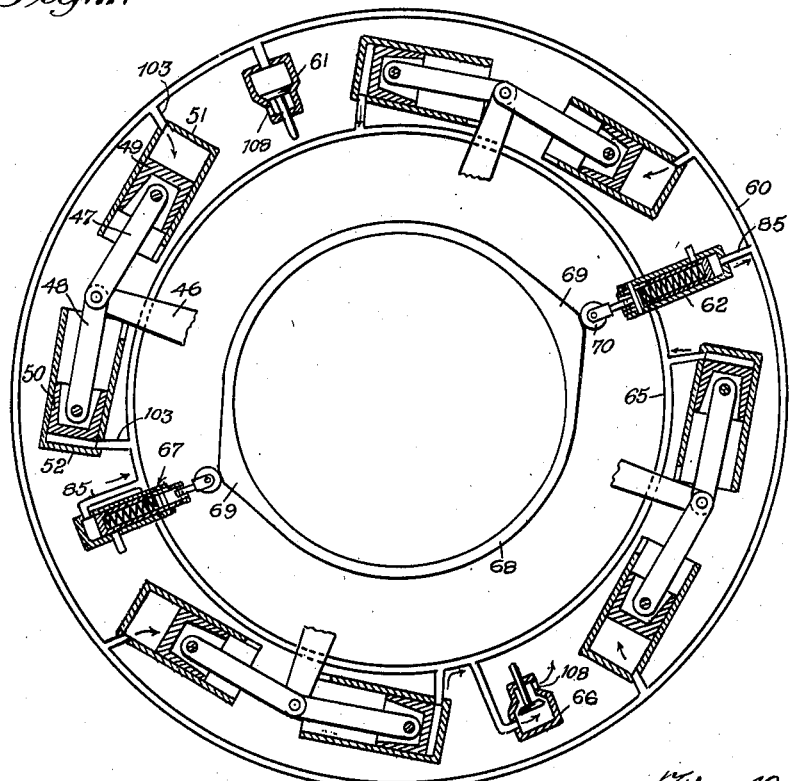
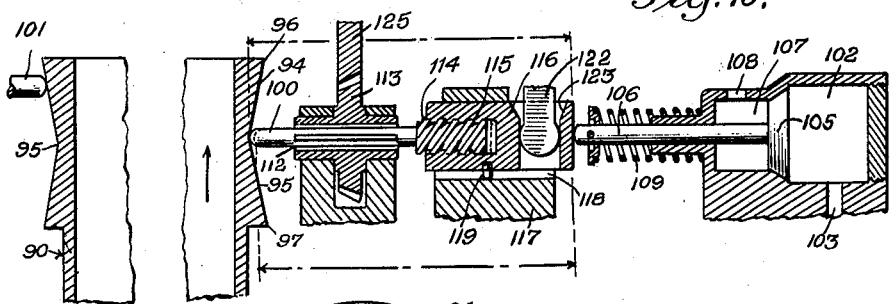
INVENTOR
Wilson Mayne Allison

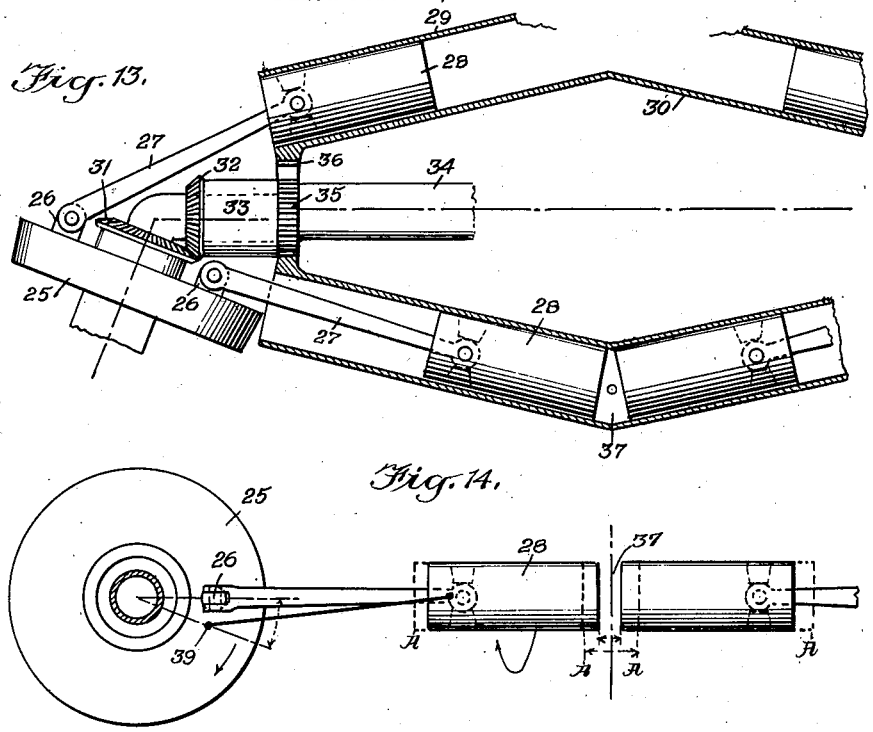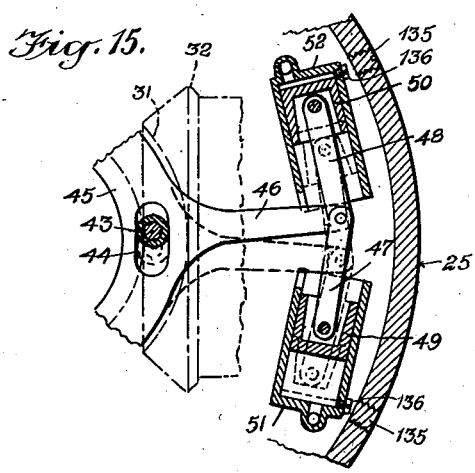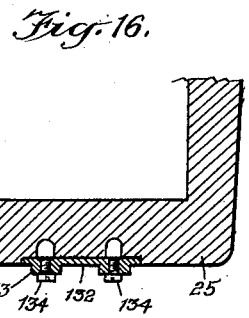

Patented Aug. 17, 1943

2,326,912

UNITED STATES PATENT OFFICE 2,326,912

COMPRESSION RATIO CONTROL

Wilson Mayne Allison, Knockshegowna, Swinburne, Orange Free State, Union of South Africa Application February 24, 1941, Serial No. 380,300

15 Claims. (Cl. 123—48)

This invention relates to motors, and more particularly to rotary motors such as are set forth and described in my co-pending applications, Serial No. 372,134 filed Dec. 28, 1941, Serial No. 372,135 filed Dec. 28, 1940, and Serial No. 375,068 filed Jan. 18, 1941.

While this invention is particularly adapted to rotary motors, such as have been identified above, it is equally applicable to any construction in which a rotatable mass, such as a flywheel or crank pin carrier, is synchronized with the rotation of another element, and where it is desired to vary the synchronization of the elements for any purpose. As is well known, motors, and particularly airplane motors, are affected by changes in atmospheric conditions with the result that full efficiency is not secured under all conditions, and in many motors the efficiency decreases greatly as higher altitudes are secured due to the difference in atmospheric pressure.

An object of this invention is to provide means for varying the compression ratio in a motor of the class described, so that a pilot may vary the compression ratio of his engine to meet different altitude conditions while in flight. It is known of course that airplanes and other motors have been built to operate more efficiently at certain altitudes and that super-chargers and similar accessories are used in an effort to compensate for the drop in pressure within the cylinders of the motor due to changes in atmospheric pressure. However, the purpose of this invention is to compensate for the drop in pressure by variation of the compression ratio, and to provide means for varying the compression ratio within prescribed limits to a predetermined point for each change in atmospheric pressure. This invention is not a substitute for the super-charger and may be used in conjunction therewith.

Other objects and advantages of the invention will become apparent as the description proceeds.

While, as has been previously stated, this invention is adapted for use in many types of rotary motors, in the accompanying drawings I have shown it adapted to an opposed piston type of rotary motor, such as is set forth and described in my co-pending application, Serial No. 372,135.

Fig. 1 is a cross-sectional view of a flywheel or crank pin carrier embodying my invention and is taken on the line I—I of Fig. 6;

Fig. 2 is a sectional view slightly enlarged showing the positioning of a valve member within the flywheel;

Fig. 3 is a detailed view, similar to that shown in Fig. 2, showing the positioning of the pump and pump-actuating mechanism in the flywheel;

Fig. 4 is a fragmentary sectional plan view of the pump shown in Fig. 3;

Fig. 5 is a sectional view through the flywheel showing the positioning of the operating cylinders and spider arms with relation to the synchronizing gear;

Fig. 6 is a plan view, partly broken away, of the fly-wheel embodying my invention;

Fig. 7 is an enlarged view showing the position of the crank pin in the flywheel;

Fig. 8 is an enlarged view of the valve-operating mechanism;

Fig. 9 is a cross-sectional view taken on the line 9—9 of Fig. 8;

Fig. 10 is an enlarged view further showing the valve-operating mechanism and the valve;

Fig. 11 is a diagrammatic view showing the fluid system and its relation to the valves and pumps;

Fig. 12 is a perspective view of the operating cam sleeve;

Fig. 13 is an outline showing the relation between the flywheel and cylinder of a rotary motor of a type in which my mechanism is adapted to be used;

Fig. 14 is a diagrammatic plan view of the piston and flywheel showing the effect of my invention;

Fig. 15 is a sectional plan view showing an outline of the operation of my device; and Fig. 16 is an enlarged view of a section of the flywheel wall showing the positioning of the oil ducts.

Referring more particularly to Figs. 13 and 14, I show a flywheel or crank pin carrier member 25 supplied with crank pins 26 engaging connecting rods 27 and pistons 28. The pistons are adapted to operate within cylinders 29 in cylinder assembly 30. The crank pin carrier 25 carries a beveled gear 31 adapted to engage a gear 32 on a sleeve 33 mounted on the spindle 34. The gear 35 on the sleeve 33 engages an annular gear 36 on the cylinder assembly 30 so that the rotation of the crank pin carrier 25 and the rotation of the cylinder assembly 30 are synchronized. Where opposed cylinders are used a common combustion chamber 37 is formed into which fuel may be injected at a predetermined point.

It will be appreciated that the travel of the piston 28 within the cylinder 29 is controlled by the synchronization between the flywheel or crank pin carrier 25 and the cylinder assembly 30; and if these members are so synchronized that a straight line may be drawn between the center of the crank pin carrier, the center of the crank pin, the connecting rod and the piston, the piston will have reached the point of furthest possible travel within the cylinder. If the synchronization is changed so that either the cylinder assembly or the crank pin carrier follows the other slightly, then at no time can a straight line be drawn between the center of the flywheel, the crank pin and the connecting rod, and the connecting rod will always have a certain angularity, as shown in diagrammatic form in Fig. 14, and the point of furthest travel of the piston within the cylinder will be changed.

Referring particularly to Fig. 14, wherein is illustrated in full lines the first position mentioned, in which a straight line may be drawn through the center of the crank pin carrier 25, through the connecting rod and through the center of the cylinder, the piston 28 is shown in its path of furthest travel and the combustion chamber 37 is reduced. Where the synchronization is changed so that the point 39 represents the crank pin 26, the position of the piston in its furthest point of travel is indicated by the dotted lines, and the combustion chamber will be larger, as shown by the dotted lines A. Quite obviously, it will be possible to maintain the pressure despite differences in atmospheric pressure by varying the synchronization between the crank pin carrier and the cylinder assembly and thus varying the compression ratio. For example, the motor is designed to operate at lower levels with the flywheel and cylinder assembly so synchronized that the pistons would define a large combustion chamber, and as higher altitudes and lower atmospheric pressure are encountered synchronization would be changed so that the combustion chamber would be reduced to maintain the same pressure. While the results described may be obtained by any means which will vary the position of the gear 31 with relation to the flywheel or crank pin carrier 25, the mechanism hereinafter described provides a sure, smooth and suitable control.

As shown in Figs. 1 and 6, the flywheel 25 is adapted to rotate about the shaft 34 and is mounted on the bearing assembly 40 fixed to the crankcase 41. The gear 32 is provided with a series of bosses 43 which extend through slots 44 in the flywheel face or top. These bosses engage a spider ring 45 and may be affixed thereto by bolts. The spider ring 45 is provided with a series of radially extending arms 46 which engage and are pivoted to connecting rods 47 and 48 leading to pistons 49 and 50 within the cylinders 51 and 52.

It will be appreciated that the movement of the pistons in the cylinders, with the resultant action on the spider ring arms and spider ring, will vary the position of the gear 32 with relation to the flywheel 25. As shown in Fig. 11, I provide two oil passages or ducts, an outer duct 60 communicating with the right cylinder of each pair of cylinders and an inner duct 65 communicating with the left-hand cylinder of each pair of cylinders. A valve 61 is provided between the duct 60 and the reservoir, and a pump 62 is likewise provided for the duct 60. The duct 65 is provided with a valve to the reservoir 66 and with a pump 67.

Mounted on the bearing assembly 40 is a cam ring 68 having high points 69 adapted to engage rollers 70 on the pumps 62 and 67 as the flywheel 25 rotates on the assembly. The pumps 62 and 67 are identical in structure, and are most clearly shown in Figs. 3 and 4. The pumps are of the spring pressure type adapted to maintain a constant pressure and are provided with a cylinder 71 and plunger 72. A spring 73 maintains a constant pressure on the plunger. The lower portion of the plunger 72 engages a link 74 which is fastened to the rocker arm 75 pivoted at 76 to the post 77. The other end 78 of the rocker arm is weighted and the roller 70 is mounted thereon. As the roller 70 is engaged by the high point 69 of the cam, the plunger is pulled outwardly in the cylinder causing the suction of oil through the port 80 past the check valve 81 into the chamber 82 of the pump. The spring 73 will exert pressure against the plunger to push it forwardly and to pass the oil through the port 83, check valve 84, into the port 85 leading to the duct 60. While the plunger is sucking in oil the check valve will prevent any oil passing through the port 85 into the chamber 82, and once the pressure operation is started the check valve 81 will prevent any oil passing from the chamber through the port 80.

It will be appreciated that the pumps will maintain steady pressure and that when the pressure built up in the ducts is equal to the pressure of the spring the pumps will remain charged and the roller 70 will have only slight contact with the cam 69. The pumps will then remain in charged position until the pressure in the ducts falls below the pressure of the spring when another pumping operation will take place.

It will also be appreciated that centrifugal force due to the rotation would affect the relative weight of the moving parts of the pump, and in order to equalize the pressure of the centrifugal force the weight 78 is provided.

Due to the centrifugal action of the flywheel, the oil supply within the flywheel 25 will be thrown against the wall 86. A port 87 is provided to dispose of excess oil which should not pass the dotted line in Fig. 3.

The valves 61 and 66 are similar in operation, and an enlarged view thereof is shown in Fig. 10. These valves are controlled and operated by a sleeve 90 positioned around the bearing assembly 40. The sleeve 90 has helical slots 91 adapted to engage pins 92 on the bearing assembly 40 so that movement of the operating lever 93 rotating the sleeve 90 will cause it to rise and fall on the bearing assembly. The sleeve 90 is provided with two cam faces 94 and 95 having high points 96 and 97 and meeting at a low point 98. Any suitable means, such as the arm 99 shown in Figs. 1 and 2 engaging the lever 93, may be used to move the lever.

The valves 61 and 66 are positioned at different levels so that the tappets 100 and 101 thereon are so placed that when the tappet 100 is opposite the low point 98 in the sleeve 90 the tappet 101 will engage the high point. The valves themselves are mounted in the flywheel 25 and include a chamber 102 having a port 103 communicating with the duct 60, in the case of the valve 61, and with the duct 65 in the case of the valve 66.

The chamber 102 is conical to form a valve seat 104 adapted to cooperate with the valve head 105. The valve stem 106 passes through a chamber 107 having a port 108 leading into the interior of the flywheel 25. A spring 109 tends to keep the valve closed.

The tappet 100 extends through a post 111 and is provided with splines 112 which engage the interior of a gear 113 positioned in the post 111.

The tappet 100 may slide laterally with relation to the gear but may not rotate with relation to the gear due to the splines 112. The radially outward end of the tappet 100 is provided with threads 114 adapted to engage similar threads 115 in the head 116 slidably mounted in the post 117. The post 117 has a groove 118 which engages a pin 119 on the head 116 to prevent its rotation. A weight 120 pivoted at 121 has an extended arm 122 which engages an opening 123 in the head 116. Since due to the rotation of the flywheel there would be a natural tendency for the valve to open due to centrifugal force, the weight 120 neutralizes this centrifugal force and allows the normal operation of the valve 120.

Mounted on the spider ring 45 adjacent the valve 66 is a segment 125 having teeth which engage the gear 113.

When the valve sleeve 90 is rotated clockwise it will rise on the bearing assembly 49 and the cam surface 95 thereof will engage the tappet 100 forcing it inwardly, thus pushing the head 116 against the valve stem 106 and opening the valve 66, allowing oil to pass through the port 103, through the chamber 102, and through the port 108 thereof, into the reservoir. This will reduce the pressure in the duct 65 and allow oil to flow from the lefthand cylinder of each pair of cylinders into the duct 65, while oil under pressure in the pump 62 will be forced from the duct 60 into the righthand cylinder of each pair of cylinders, thus moving the spider 45 counter-clockwise due to pressure on its arms 46 and changing the synchronization between the flywheel 25 and the cylinder assembly 30. As the spider rotates the segment 125 will rotate the gear 113 turning the tappet 100 and causing it to screw into the head 116 on the threads 114, thus shortening the tappet 100 and allowing the valve 66 to close. At the same time the segment 126 will cooperate with the corresponding gear on the valve 61 causing its tappet to unscrew from its head and to lengthen the tappet. Naturally, when the sleeve 90 is raised the tappet 101 of the valve 61 will be brought toward a lower portion of the cam surface 94 and, until the tappet 101 is unscrewed from its head to lengthen it, will be out of contact with the sleeve.

It will be understood of course that on one pump the tappet will be provided with a right-hand thread while on the other pump the tappet will be provided with a lefthand thread.

It will be appreciated that as the sleeve 90 is rotated back and forth the position of the tappets 100 and 101 will be varied, and as one valve is opened the resultant turning of the spider with its segments 125 and 126 will adjust the tappets. In actual practice the tappets will be built so that there will be a slight clearance between them and the sleeve 90.

It will also be appreciated that minute adjustments between the flywheel 25 and the gear 31 may be made due to the slight rotation of the sleeve. Graduations will therefore be provided to indicate to the pilot the exact position of the sleeve. As has been previously pointed out, the oil in the flywheel will be thrown against the side wall 86 thereof due to centrifugal force. The port 87 is provided to allow the excess oil to be returned to the crankcase. Oil is fed to the interior of the flywheel through the bearing assembly and through the port 130 into the center thereof.

While in the drawings I have shown the ducts as circular in form, this is merely for the purpose of illustration, and these ducts in actual practice may be drilled in straight lines and joined.

Plugs 135 in the side wall of the flywheel and plugs 136 in the cylinders are provided for bleeding the cylinders. As shown in the cross-sectional views, the ducts 60 and 65 are formed in the lower portion of the flywheel. These ducts are covered by an annular plate 132 and the plate 132 is provided with bosses 133 adapted to receive threaded plugs 134. By removing the plugs 134, 135 and 136, oil may be forced through the opening holding the plug 134 into the ducts 60 and 65 and into the cylinders 51 and 52. All the plugs may then be replaced and the assembly will then be ready for operation.

Normal lubrication is provided for the crank pins 26 and their bearings, and in order to prevent the crank pins receiving too much oil a sleeve 140 is provided. This sleeve may be riveted at 141 to the bottom of the flywheel and bolted at 142 to the top thereof. Bolts 143 are provided for holding the face of the flywheel in position, while bolts 144 hold the spider ring to the gear 32.

I claim:

1. In a rotary motor having a cylinder assembly mounted for rotation, cylinders in said cylinder assembly, pistons in said cylinder, a crank pin carrier mounted for rotation at an angle to said cylinder assembly, connecting rods connecting said pistons and said crank pin carrier, gear means on said crank pin carrier and gear means on said cylinder assembly communicating with said gear means of said crank pin carrier for synchronizing the rotation thereof, and means for varying the path of travel of said pistons in said cylinders, said means comprising mechanism for varying the relation between said crank pin carrier and its synchronizing gear.

2. The combination with a rotary motor having a crank pin carrier and a cylinder assembly mounted for rotation at an angle to each other and having gear means on said cylinder assembly and on said crank pin carrier for synchronizing the rotation of said members, of means for varying the compression ratio of said motor, said means comprising mechanism for varying the position of one of said synchronizing gears with relation to the member on which it is carried.

3. The combination with a rotary motor having a cylinder assembly and a crank pin carrier mounted for rotation at an angle to each other and having synchronizing means communicating between said cylinder assembly and crank pin carrier, of means for varying the compression ratio of said motor, said means comprising mechanism for varying the synchronization between said crank pin carrier and said cylinder assembly.

4. A rotary motor having a cylinder assembly and a crank pin carrier mounted for rotation at an angle to each other, gear means communicating with said cylinder assembly and cooperating gear means on said crank pin carrier for synchronizing the rotation of the two members, said gear means on said crank pin carrier being mounted for relative movement thereon, and means for adjusting the position of said gear means with relation to said crank pin carrier.

5. In a rotary motor, a crank pin carrier, a cylinder assembly, gear means on said crank pin carrier for synchronizing the rotation of said crank pin carrier with said cylinder assembly, means for varying the position of said gear means with relation to said crank pin carrier, said means comprising a spider ring fixed to said gear, arms on said spider ring, and means for exerting pressure on the ends of said arms to selectively position said gear with relation to said crank pin carrier.

6. The combination with a rotary motor having a cylinder assembly and a crank pin carrier mounted for rotation at an angle to each other, and engaging gear means between said cylinder assembly and crank pin carrier controlling the synchronization thereof, of means for varying the compression ratio of said motor, said means comprising a spider ring engaging the synchronizing gear on said crank pin carrier, arms on said spider ring, pistons and cylinders engaging said arms, fluid ducts communicating with said cylinders, pumps and valves controlling the passage of fluid through said ducts whereby the position of said pistons in said cylinders may be varied to control the position of said gear with relation to said crank pin carrier.

7. In a device of the character described, a crank pin carrier, slots in the face of said crank pin carrier, a synchronizing gear, bosses on said synchronizing gear engaging in said slots, a spider ring, arms on said spider ring, a pair of cylinders positioned adjacent the end of each of said arms, pistons in said cylinders, connecting rods between each of said pistons and the end of said arms, fluid ducts leading to each of said cylinders, a cam-operated pump for each of said fluid ducts adapted to maintain pressure in said ducts, a valve for each of said fluid ducts adapted to lower the pressure of said ducts, tappets on each of said valves, and a cam-faced sleeve adapted to engage said tappets and to control the operation of said valves.

8. In a device of the character described, a valve, a stem on said valve, a head engaging said stem, a tappet, a threaded end on said tappet, a threaded opening in said head, splines on said tappet, a gear member surrounding said tappet engaging said splines, a cam member adapted to engage said tappet to exert pressure thereon to open said valve, and means engaging said gear member to cause said tappet to screw into said head to allow said valve to close.

9. In a rotary motor of the type described, a crank pin carrier mounted for rotation on a bearing assembly, a synchronizing gear on the face of said crank pin carrier, a member within said carrier engaging said gear, an hydraulic system including cylinders, pistons, pumps and valves cooperating with said member to vary the position of said member with relation to said crank pin carrier, a sleeve having cam faces slidably mounted on said bearing assembly and engaging the operating mechanism of said valves, whereby the movement of said sleeve on said bearing assembly will control said valves, the operation of said hydraulic system, and the position of said gear with relation to said crank pin carrier.

10. In a motor of the class described, a crank pin carrier mounted for rotation on a bearing assembly, a synchronizing gear adjustably mounted on the face of said crank pin carrier and having a member extending within said crank pin carrier, an hydraulic system including cylinders, pistons, pumps and valves engaging said member adapted to move said member to vary the position of said gear with relation to said crank pin carrier, a cam ring having high points mounted on said bearing assembly adapted to engage the mechanism of said pumps to maintain pressure within said system, and a cam-faced sleeve slidably mounted on said bearing assembly to control said valves.

11. In a motor of the class described, a crank pin carrier, a synchronizing gear mounted in said crank pin carrier, hydraulic means communicating with said synchronizing gear to vary the position of said gear with relation to said crank pin carrier, said hydraulic means including a pump mounted within said crank pin carrier and adapted to maintain pressure in said system, an operating arm on said pump, and a cam on said crank pin carrier mounting adapted to engage said operating arm to operate said pump.

12. In a motor of the class described, a crank pin carrier, a synchronizing gear mounted in the face of said crank pin carrier and having a member extending into the interior thereof, hydraulic means engaging said member and adapted to vary the position of said gear with relation to said crank pin carrier, a sleeve positioned in the mounting of said crank pin carrier and having cammed faces, a pair of valves in said hydraulic system positioned with their operating mechanism to contact said sleeve, whereby the movement of said sleeve on said mounting will control the operation of said valves.

13. A device as set forth in claim 12, in which each of said valves is provided with a tappet, a head having a threaded portion, a threaded end on said tappets adapted to engage said threaded portions, splines on said tappets, a gear surrounding each tappet engaging said splines, segments on said member engaging said gears, whereby the movement of said sleeve will force one of said tappets inwardly to open its valve and operate said hydraulic system causing said member to rotate and causing one of said tappets to screw into its head to allow its valve to close, and the other of said tappets to unscrew from its head so that said tappet remains in operative position with relation to said sleeve.

14. In a rotary motor of the class described, a crank pin carrier, a synchronizing gear mounted on said crank pin carrier and having a member extending into said crank pin carrier, an hydraulic system engaging said member and adapted to move said member to selectively position said gear with relation to said crank pin carrier, said hydraulic system including cylinders, pistons, valves and pumps, and weighted members on each of said valves and pumps adapted to neutralize the effect of centrifugal force when said crank pin carrier is rotated.

15. In a motor of the class described, a crank pin carrier mounted for rotation, a synchronizing gear on said crank pin carrier, a member engaging said gear and extending within said crank pin carrier, hydraulic means cooperating with said member for varying the position of said gear with relation to said crank pin carrier, said hydraulic means including cylinders, pistons, pumps and valves, a cam-faced sleeve positioned on the mounting of said crank pin carrier and adapted to engage the operating mechanism of said valves, helical slots in said sleeve, pins on said mounting engaging said slots, whereby the rotation of said sleeve on said mounting will cause said sleeve to rise or fall longitudinally on said mounting to present different portions of said cam face to said operating mechanism of said valves.

W. M. ALLISON.